United States Patent
Hamilton, Sr.

[11] Patent Number: 5,811,740
[45] Date of Patent: Sep. 22, 1998

[54] WEIGHT MEASURING DEVICE FOR COOKING APPLIANCE

[76] Inventor: Brian L. Hamilton, Sr., 3709 Kelly Blvd., Carrollton, Tex. 75007

[21] Appl. No.: 719,802

[22] Filed: Sep. 25, 1996

Related U.S. Application Data

[63] Continuation-in-part of Ser. No. 546,890, Oct. 23, 1995.

[51] Int. Cl.⁶ .......................... G01G 19/52; G01G 23/14; G01G 19/00; A23L 29/00
[52] U.S. Cl. .......................... 177/144; 177/168; 177/245; 99/342
[58] Field of Search ............... 99/342, 343; 177/245, 177/147, 144, 168, 169, 170

[56] References Cited

U.S. PATENT DOCUMENTS

| | | | |
|---|---|---|---|
| 811,979 | 2/1906 | Wiese | 177/168 |
| 822,641 | 6/1906 | Walker | 177/168 |
| 878,915 | 2/1908 | Verplast | 177/168 |
| 902,769 | 11/1908 | Sirch | 177/168 |
| 1,594,536 | 8/1926 | Ludlow | 177/168 |
| 2,029,926 | 2/1936 | Hurt | 177/168 |
| 2,658,746 | 11/1953 | Karp et al. | 177/168 |
| 3,352,372 | 11/1967 | Gerlach | 177/168 |
| 4,171,067 | 10/1979 | Faulkner et al. | 177/106 |
| 4,650,970 | 3/1987 | Ohouchi | 177/6 |
| 4,683,967 | 8/1987 | Hanatani et al. | 177/144 |
| 4,784,052 | 11/1988 | Harada et al. | 177/245 |
| 4,875,533 | 10/1989 | Mihara et al. | 177/144 |
| 5,353,847 | 10/1994 | Cahlander et al. | 177/114 |
| 5,544,567 | 8/1996 | Davis et al. | 99/336 |

*Primary Examiner*—Renee S. Luebke
*Assistant Examiner*—Randy W. Gibson
*Attorney, Agent, or Firm*—Haynes and Boone, L.L.P.

[57] ABSTRACT

A weight measuring device for an appliance which has a heating portion configured for receiving and heating a container having food products contained therein. A housing is attached to the cooking appliance. A resilient support is connected to the housing for resiliently supporting in a position above the heating portion the container and the food products contained within the container, wherein the supporting means is displaced from the housing an amount proportional to the weight supported by the supporting means. A meter indicates, from the magnitude of the displacement of the supporting means from the housing, the weight of the food products.

18 Claims, 2 Drawing Sheets

5,811,740

WEIGHT MEASURING DEVICE FOR COOKING APPLIANCE

CROSS-REFERENCE TO RELATED APPLICATION

This application is a continuation in part of co-pending patent application Ser. No. 08/546,890, entitled "Stationary Foodservice Portion Control Device" filed Oct. 23, 1995.

BACKGROUND OF THE INVENTION

The present invention relates to a weight measuring device and, more particularly, to such a device attached to a cooking appliance for measuring the weight of food products.

Food products must often be weighed before they are prepared for consumption or are sold. For example, cooking recipes commonly provide cooking temperatures and times based on a specified weight of a food product to be prepared and cooked. In the food service industry, food products are generally sold by weight. To measure the weight of such food products, the food products typically are placed on a scale located on a counter-top near the food production area.

The preparation of fried food products, such as French fries, provides an example of how currently food products must be weighed before they are prepared. To cook a specified weight of French fries, potato strips must first be placed in a wire basket positioned on a weight measurement scale located on a counter-top in a food preparation area until a desired weight is obtained. The basket is then placed in a tank of hot cooking oil for an amount of time and at a temperature specified for the French fries being prepared. The basket is then removed from and supported above the tank of oil to allow oil on the fries and the basket to drip back into the tank of oil.

While weight measurements are clearly useful for measuring quantities of food product, there are a number of drawbacks associated with conducting such measurements. For example, a scale required for such weight measurements uses valuable space on a counter-top that could be readily used by other appliances for other purposes. Where a basket is repeatedly used to weigh and fry food products in hot oil, the basket will likely be hot and slippery (from oil) to handle, and thus create a potentially unsafe condition wherein the basket could be dropped and hot oil splatter onto and burn the user. Hot oil from a dropped basket could even start a fire. Moreover, as a basket is transferred between the tank of oil and the weighing scale, hot oil may drip from the basket onto the counter-top and the scale, thereby also creating an environment which is unclean to work in and which may even violate public sanitation regulations.

Therefore, what is needed is a food weighing system which does not use valuable counter-top space, and which does not create an unclean or unsafe environment to prepare food products in.

SUMMARY OF THE INVENTION

The present invention, accordingly, provides for a cooking appliance a weight measuring device that does not use valuable counter-top space, and which does not create an unclean or unsafe environment in which food products are prepared. To this end, the device of the present invention comprises a weight measuring device for an appliance which has a heating portion configured for receiving and heating a container having food products contained therein. A housing is attached to the cooking appliance. A resilient support is connected to the housing for resiliently supporting, in a position above the heating portion, the container and the food products contained within the container, wherein the supporting means is displaced from the housing an amount proportional to the weight supported by the supporting means. A meter indicates, from the magnitude of the displacement of the supporting means from the housing, the weight of the food products.

An advantage achieved with the present invention is that food products may be weighed without a counter-top scale, so that valuable counter-top space is not used, thereby leaving counter-top space for other cooking appliances.

Another advantage achieved with the present invention is that it obviates the need to transfer a basket dripping with hot oil across a counter-top, thereby rendering the food production area cleaner and safer to work in.

Another advantage achieved with the present invention is that it decreases the need for a hot basket to be handled, thereby providing for a safer cooking environment.

DETAILED DESCRIPTION OF THE PREFERRED EMBODIMENT

Figure 1:
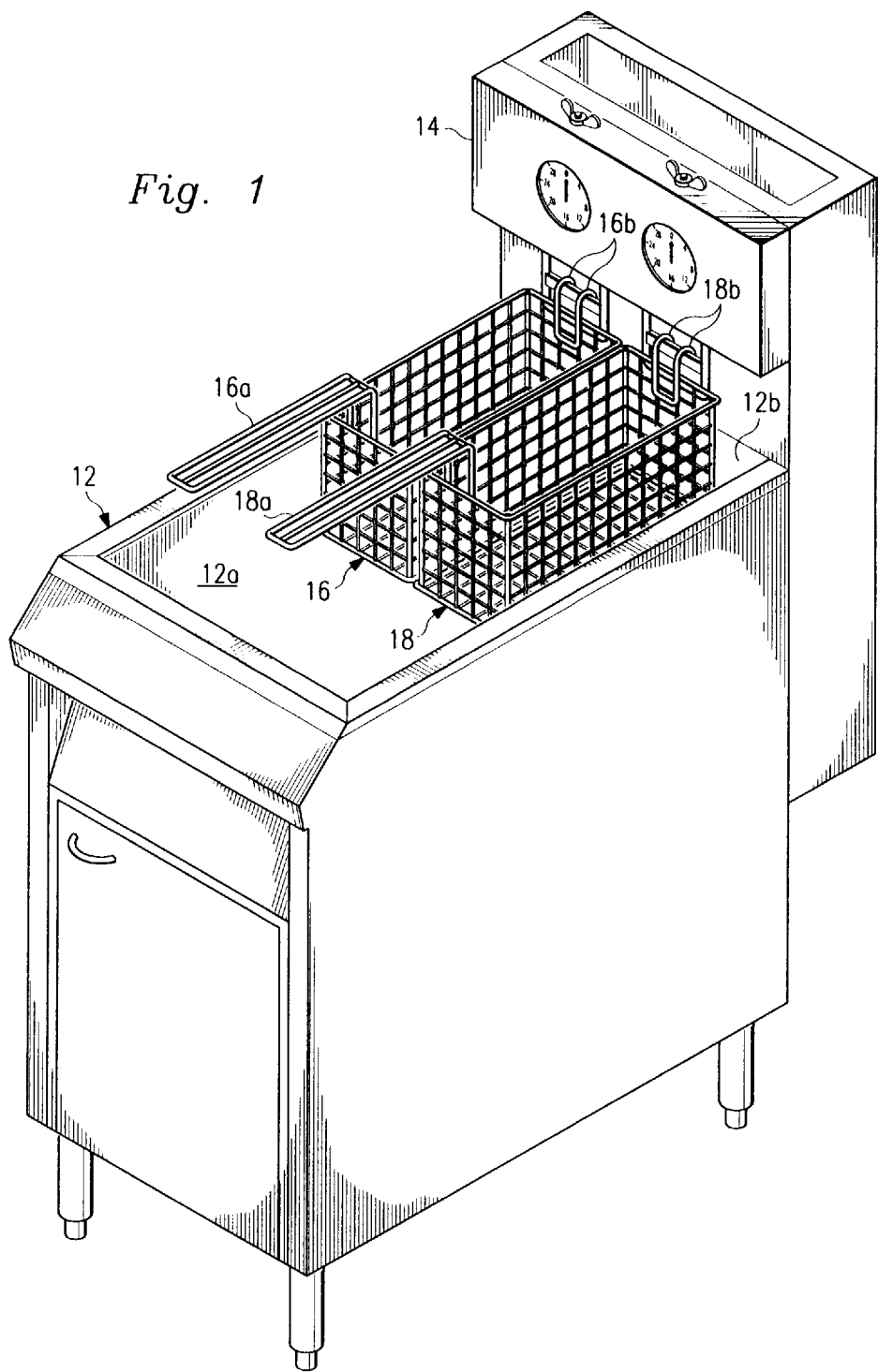
FIG. 1 is a perspective view of a cooking appliance having a weight measuring device embodying features of the present invention.

Referring to FIG. 1, the reference numeral 10 refers, in general, to a system comprising a cooking appliance 12 having a weight measuring device 14 mounted thereon embodying features of the present invention for measuring the weight of food products. The cooking appliance 12 is a conventional commercial deep fat fryer and includes a heating portion having a tank 12a for holding cooking oil (not shown), and an internal heating system (not shown) for heating the cooking oil. The weight measuring device 14 is mounted to the fryer above a rear end 12b of the tank 12a. Two containers, such as baskets 16 and 18 having respective handles 16a and 18a and respective support lips 16b and 18b, are provided for containing food products (not shown) to be fried in the tank 12a. The weight measuring device 14 is configured in a manner described below for receiving the lips 16b and 18b for supporting above the tank, and for weighing, the wire baskets 16 and 18 and food products contained therein. Since the fryer 12 and the baskets 16 and 18 are well known in the art, they will not be described in greater detail herein.

Figure 2:
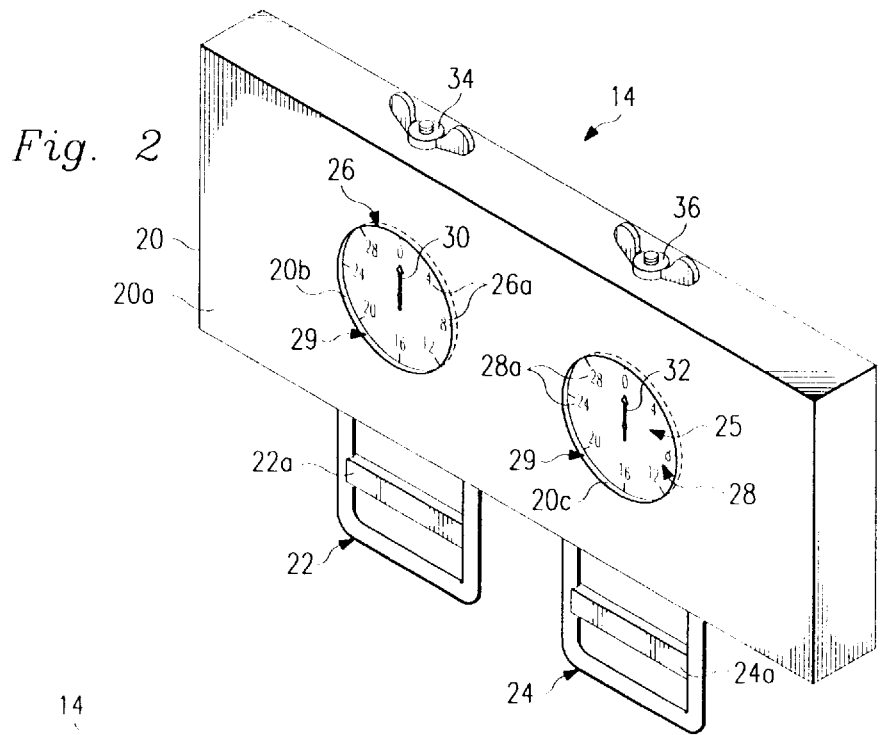
FIG. 2 is a front perspective view of the weight measuring device of FIG. 1.

With reference to FIG. 2, the weighing device 14 includes a housing 20 and two basket support rungs 22 and 24 which are resiliently supported from the housing in a manner described below with reference to FIG. 3. The rungs 22 and 24 include respective cross-members 22a and 24a for receiving respective support lips 16b and 18b for supporting respective baskets 16 and 18, as shown in FIG. 1. The housing 20 includes a face 20a having two openings 20b and 20c formed therein. A metal plate 25 is secured to the interior of the housing 20 and extends across the two openings 20b and 20c. Two dial meter faces 26 and 28 are formed on the metal plate 25 and are visible through the openings 20b and 20c. A sheet 29 of clear material such as LEXAN® or glass is positioned between the face 20a and the plate 25 for protecting the dial meter faces 26 and 28. The dial meter faces 26 and 28 include angularly spaced numbers 26a and 28a, respectively, representing a number of ounces (or other units of weight), the numbers being arranged around the perimeter of the respective dials in clockwise ascending order. Indicator arrows 30 and 32 are mounted on pins (not shown in FIG. 2) which are rotatably mounted in the center of the respective dial meter faces 26 and 28 for indicating a respective number 26a and 28a of ounces supported by the device 14. Two calibration wingnuts 34 and 36 are positioned on top of the housing 20 for threadingly engaging screws, not shown in FIG. 2 but described below with reference to FIG. 3, for calibrating the weight readings indicated by the meter faces 26 and 28.

Figure 3:
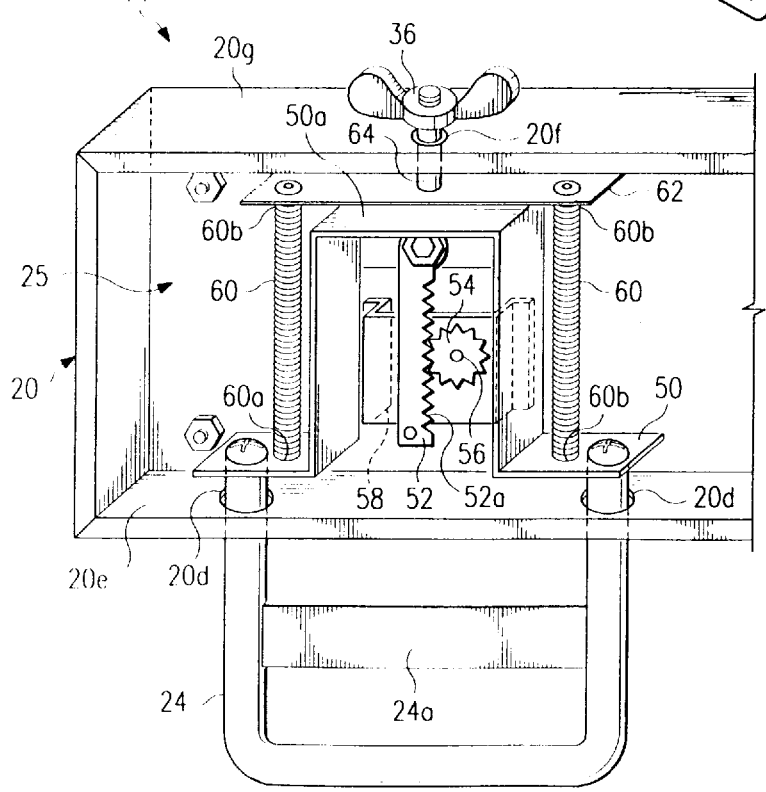
FIG. 3 is a rear perspective view of a portion of the weight measuring device of FIG. 1.

FIG. 3 depicts a rear view of a portion of the weighing device 14 showing the mechanical interconnection between the aforementioned rung 24, the meter 28, and the wingnut 36. While not shown, the mechanical interconnection between the aforementioned rung 22, the meter 26, and the wingnut 34 is identical to that for the rung 24, the meter 28, and the wingnut 36 and thus will not be described in detail. In accordance with FIG. 3, the rung 24 extends through a pair of holes 20d formed in a lower wall 20e of the housing 20 and is secured to a shaped plate 50. A long gear 52 is secured to, and extends downwardly from, an upper portion 50a of the plate 50. The long gear 52 includes teeth 52a formed along one edge thereof which mesh with the teeth of a round gear 54 mounted on a pin 56 rotatably mounted between the plate 25 and a bracket 58 secured to the plate 25. The pin 56 extends through the center of the dial meter face 28 of the plate 25 to the indicator arrow 32, such that the indicator arrow 32 moves synchronously with the round gear 54.

A pair of springs 60 are provided, each of which have a lower end 60a connected to opposing ends of the shaped plate 50, and an upper end 60b connected to opposing ends of a flat plate 62. A screw 64 is centrally attached to a flat plate 62 and extends upwardly through a hole 20f formed in an upper wall 20g of the housing 20 for threadingly engaging the wingnut 36 for purposes described below. The rear of the housing 20 is enclosed with a back cover (not shown) which includes a number of appropriately spaced holes formed therein for mounting the device 14 to the fryer 12.

In operation, the weight measuring device 14 is mounted to the deep fat fryer 12 above the rear end 12b of the tank 12a. The support lips 16b and 18b of the baskets 16 and 18, respectively, are placed in the rungs 22 and 24 on the cross-members 22a and 24a so that the baskets are supported above the tank 12a, thereby enabling oil on the baskets to drip into the tank. It is understood that, while two baskets are described herein, the system may be implemented with only one basket 16 or 18. Food products (such as French fries, not shown) to be fried are then placed in the baskets 16 and 18. The weight of the baskets 16 and 18 and the food products contained therein is carried by the springs 60. As food products are placed in the baskets 16 and 18, the supported weight is increased, the springs 60 deflect, and the rungs 22 and 24 are displaced downwardly an amount proportional to the weight being supported. The downward displacement of the rungs 22 and 24 causes the respective shaped plate 50 and long gear 52 (only one plate and gear of which are shown) to move downwardly and rotate the respective round gear 54 and the indicator arrows 30 and 32 connected thereto. The indicator arrows 30 and 32 then point to a respective number 26a and 28a indicating the number of ounces of food product contained within the baskets 16 and 18. The baskets 16 and 18 may be filled in such manner with food products until a desired weight, indicated by the arrow indicators 30 and 32, is attained. Once the baskets 16 and 18 are filled with a desired quantity of food products, the baskets may be lifted off of the device 14 and lowered into the tank 12a of oil and the food products cooked (i.e. fried) in a conventional manner. Once the food product is cooked, the baskets 16 and 18 may be lifted out of the tank 12a of oil and supported by the device 14, to permit oil to drip into the tank, and then the food product may be transferred into a serving container (not shown).

The weight of the baskets and food products indicated by the indicator arrows 30 and 32 on the respective dial meter faces 26 and 28 may be calibrated by turning the respective wingnuts 34 and 36 about the respective threaded screws 64 to either raise or lower the flat plate 62 relative to the shaped plate 50, thereby increasing or decreasing, respectively, the tension of the springs 60 and the weight indicated by the meters 26 and 28. It can, furthermore, be appreciated that the meters 26 and 28 may be calibrated by increasing the tension of the springs 60 sufficiently, so that the weight of the baskets 16 and 18 (i.e., the "tare" weight) is not included in the weight indicated by the indicator arrows 30 and 32 when the baskets are supported by the rungs 22 and 24. By thus calibrating the weighing device 14, the weight indicated by the indicator arrows 30 and 32 will indicate the "zero" tare, or net, weight of the food product contained within the baskets 16 and 18.

The present invention has several advantages. For example, food product to be fried in the fryer 12 may be weighed without using a counter-top weighing device which uses valuable counter-top space, thereby providing more space for other cooking appliances. The present invention also obviates the need to transfer a basket dripping with hot oil across a counter-top for weight measurement, thereby rendering the food production area cleaner and safer to work in. The present invention also decreases the need for a hot oily basket to be handled, thereby providing for a safer cooking environment.

It is understood that several variations may be made in the foregoing without departing from the scope of the invention. For example, the weight measuring device 14 may be adapted for use above or proximate to any type of cooking appliance, in addition to deep fat fryers, such as a pasta cooker or a stove top, and may utilize fluids other than oil, such as water. The weigh measuring device 14 may also be used with containers other than baskets, such as pots and pans, and for the preparation of virtually any type of food product. The shaped plate 50 may be flat with the long gear 52 extending upwardly therefrom for engagement with the round gear 54. The meter faces 26 and 28 may comprise digital displays using appropriate electronic technology. The weight of the food product may be measured using elements other than mechanical springs, such as piezoelectric transducers and/or strain gauges.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A weight measuring device for an appliance having a heating portion configured for receiving and heating a container having food products contained therein, the device comprising:

a housing for attachment to the cooking appliance;

means connected to the housing for resiliently supporting in a position above the heating portion the container and the food products contained within the container, wherein the supporting means is displaced from the housing an amount proportional to the weight supported by the supporting means; and means for indicating, from the magnitude of the displacement of the supporting means from the housing, the weight supported by the supporting means.

2. The device of claim 1 wherein the cooking appliance is a fryer.

3. The device of claim 2 wherein the heating portion comprises an open-top tank configured for holding cooking oil, and wherein the container is positioned over the tank when the container is supported by the supporting means.

4. The device of claim 1 wherein the container comprises at least one wire basket.

5. The device of claim 1 wherein the supporting means comprises at least one rung extending downwardly from the device, the rung being configured for receiving and supporting the container.

6. The device of claim 1 wherein the supporting means comprises at least one spring connected between the supporting means and the housing for providing resilient support for the container.

7. The device of claim 1 wherein the indicating means comprises at least one dial meter face.

8. The device of claim 1 further comprising means for calibrating the indicating means.

9. The device of claim 1 further comprising means for calibrating the indicating means so that the indicated magnitude is correlated with the net weight of the contents of the container supported by the supporting means.

10. The device of claim 1 wherein the housing is integrally attached to the cooking appliance.

11. A food weighing and cooking system comprising:

a container configured for containing food products;

an appliance having a tank configured for holding a cooking fluid and for cooking food products received in the tank;

a housing positioned on the cooking appliance;

means connected to the housing for resiliently supporting the container in a position above the tank, wherein the supporting means is displaced from the housing an amount proportional to the weight supported by the supporting means; and means for indicating, from the magnitude of the displacement of the supporting means from the housing, the weight supported by the supporting means.

12. The device of claim 11 wherein the cooking appliance is a fryer and the cooking fluid is oil.

13. The device of claim 11 wherein the container comprises at least one wire basket.

14. The device of claim 11 wherein the supporting means comprises at least one rung extending downwardly from the device, the rung being configured for receiving and supporting the container.

15. The device of claim 11 wherein the supporting means comprises at least one spring connected between the housing and the rung for providing resilient support for the container.

16. The device of claim 11 wherein the indicating means comprises at least one dial meter face.

17. The device of claim 11 further comprising means for calibrating the indicating means so that the indicated magnitude is correlated with the weight supported by the supporting means.

18. The device of claim 11 further comprising means for calibrating the indicating means so that the indicated magnitude is correlated with the net weight of the contents of the container supported by the supporting means.

* * * * *